UNITED STATES PATENT OFFICE.

FREDERICK E. KEY, OF ST. LOUIS, MISSOURI, ASSIGNOR TO KEY BOILER EQUIPMENT COMPANY, OF ST. LOUIS, MISSOURI, A CORPORATION OF MISSOURI.

SEALING-PASTE.

1,391,738.  Specification of Letters Patent.  Patented Sept. 27, 1921.

No Drawing.   Application filed March 18, 1920. Serial No. 366,981.

*To all whom it may concern:*

Be it known that I, FREDERICK E. KEY, a citizen of the United States of America, a resident of the city of St. Louis, in the State of Missouri, have invented certain new and useful Improvements in Sealing-Paste, of which the following is a full, clear, and exact description.

This invention relates to improvements in sealing paste especially adapted for use in joints exposed to heat. For example, the new compound may be applied to boiler plugs, gasket joints and many other different kinds of joints for the purpose of preventing leakage and at the same time protecting the members of the joint from oxidization and corrosion. In addition to having these advantages, the new compound contains a lubricant which permits free separation of the joint forming members.

Briefly stated, the new compound includes a lubricant mixed with an adhesive which expands, carbonizes and hardens in an expanded condition when subjected to heat. The adhesive substance serves as a binder for the lubricant, permitting the mixture to be easily applied to the adjacent faces of the joint forming members, and when the joint is heated the adhesive expands so as to very effectively fill all irregular minute crevices in the joint, and thereafter the adhesive carbonizes and hardens in its expanded condition. The joint is thus sealed by a hard expanded mixture containing a lubricant.

The new paste is especially adapted for use in the joints formed by detachable parts of steam boilers and other apparatus wherein the joints are subjected to a temperature higher than 212° F.

More specifically stated, the paste preferably comprises a mixture of graphite and an adhesive substance such as molasses. The molasses contains water which vaporizes at about 212° F. and as the temperature rises, this vaporization is followed by expansion and rapid carbonization of the remaining elements of the molasses. As a result of the expansion and carbonization, the hot joint is effectively sealed by a hard and firm mixture expanded in the joint to fill all of the irregularities therein. This is accomplished without destroying the lubricating properties of the graphite, so the joint forming members are protected from injurious oxidization and the like, and the sealing compound does not cement the joint forming members to each other. The adhesive properties of the molasses are destroyed by carbonization, but the lubricating properties of the graphite are not destroyed. However, while the paste is being applied to the smooth faces of the joint forming members, the molasses forms a desirable adhesive or binder for the graphite, and the adhesive mixture can be very easily distributed over a smooth surface.

Fermentation may be caused by exposure of molasses to ordinary atmospheric temperatures, and to prevent such fermentation while the compound is in storage, a small quantity of sodium bisulfite or sulfurous oxid may be added to the mixture. Objectionable odor can be eliminated by adding oil mirbane. However, the most important results of the invention can be obtained by the use of a mixture containing only graphite and molasses.

The following formula will enable others to make a compound having all of the advantages herein pointed out:

Low grade New Orleans molasses_ 6 gallons.

A small quantity of water may be mixed with the molasses to serve as a thinner therefor.

Air floated graphite (powdered)_ 60 pounds.
Sodium bisulfite_____ ¼ ounce.
Oil mirbane_____ ½ pint.

The mixture should be thoroughly ground to very effectively commingle and unite the different ingredients.

I claim:

1. A sealing paste of the character described comprising graphite powder mixed with molasses and water.

2. A sealing paste comprising graphite mixed with a fermentative substance capable of expanding and hardening when subjected to heat, and a substance preventing fermentation mixed with the aforesaid ingredients.

3. A sealing paste of the character described comprising graphite mixed with molasses, and a substance preventing fermentation of the molasses.

4. A sealing paste of the character described comprising graphite mixed with molasses and sodium bisulfite.

In testimony that I claim the foregoing I hereunto affix my signature.

FREDERICK E. KEY.